(12) United States Patent
Chan-Wing

(10) Patent No.: US 7,530,701 B2
(45) Date of Patent: May 12, 2009

(54) PHOTOGRAPHIC FLASHLIGHT

(75) Inventor: Lawrence Ng Chan-Wing, Rosemead, CA (US)

(73) Assignee: Stuart A. Whang, Compton, CA (US)

( * ) Notice: Subject to any disclaimer, the term of this patent is extended or adjusted under 35 U.S.C. 154(b) by 29 days.

(21) Appl. No.: 11/710,006

(22) Filed: Feb. 23, 2007

(65) Prior Publication Data

US 2008/0205031 A1   Aug. 28, 2008

(51) Int. Cl.
*G03B 15/06* (2006.01)

(52) U.S. Cl. .................. 362/17; 362/16; 362/255; 359/566; 359/569; 359/570

(58) Field of Classification Search .............. 362/16, 362/17, 255, 361; 359/558, 563, 566–570, 359/574
See application file for complete search history.

(56) References Cited

U.S. PATENT DOCUMENTS

| | | | | |
|---|---|---|---|---|
| 4,586,781 A | * | 5/1986 | Gunther et al. | 359/15 |
| 5,760,955 A | * | 6/1998 | Goldenberg et al. | 359/456 |
| 7,380,966 B2 | * | 6/2008 | Fong | 362/375 |
| 2004/0075898 A1 | * | 4/2004 | Sakaguchi et al. | 359/456 |

* cited by examiner

*Primary Examiner*—Thomas M Sember
(74) *Attorney, Agent, or Firm*—David and Raymond Patent Firm; Raymond Y. Chan

(57) ABSTRACT

A light diffusion arrangement, for a photographic device having a flashlight, includes a diffuser housing, a plurality of diffracting mesh members, and a plurality of light diffusing elements. The diffuser housing has a light-admissible surrounding sidewall radially extended from a base portion to define a light diffraction cavity. The diffracting mesh members are integrally formed on an inner side surface of the surrounding sidewall of the diffuser housing, while the light diffusing elements are integrally formed on an outer side surface of the surrounding sidewall of the diffuser housing, wherein the diffracted light is arranged to impinge on the light diffusing elements from the light diffraction cavity, in such a manner that each of the light diffusing elements is adapted to diverge the diffracted light for diffusing the diffracted light, so as to provide a uniform light diffusion effect as an optimal lighting effect for the photographic device.

16 Claims, 3 Drawing Sheets

PHOTOGRAPHIC FLASHLIGHT

BACKGROUND OF THE PRESENT INVENTION

1. Field of Invention

The present invention relates to a photographic device, and more particularly to a photographic flashlight which is capable of producing flashes which is suitably diffused and diffracted for achieving an optimal photographic performance.

2. Description of Related Arts

A conventional flashlight usually comprises a light source which is capable of producing high-intensity flashlight, and a flash housing for securely mounting the light source. The flash housing is then mounted onto a wide variety of devices, such as cameras, for providing flashes for particular purposes, such as providing adequate illumination when the camera is taking pictures.

As a matter of fact, there are several disadvantages in relation to conventional flashlights. For example, the flashes produced by conventional flashlights may be too short or too long in time so that the objects being shot are not properly illuminated. Similarly, the intensity of the flashes may be too low or too high such that the illumination produced by the flashlights is not suitable or optimal for the particular purposes for which the flashlights are utilized.

Because of these disadvantages, several improvements over conventional flashlights have been developed. First, U.S. Pat. No. 4,066,885 to Weinburg generally discloses a light extractor-diffuser for a camera flash unit. The device bounces the light off a central bilateral trapezoidal panel which is supported by two triangular shapes on its sides. The object of that invention is to provide an improved bounce flash adapter for photography, so as to achieve proper illumination without glare for a target object. The problem with this conventional device is that the light extractor-diffuser is inflexible in that the diffusion of light is largely due to the geometry of the diffuser, notable the several triangular panels, and the trapezoidal panel thereof. As a result, adjustment of the diffusion effect of that conventional diffuser requires adjustment of the angle of inclination between the triangular panels and the trapezoidal panel. The patent itself discloses a 45° degree angle of inclination and a 60° angle of inclination. What matters is that diffusers of different angles require different manufacturing equipments and this substantially increases the relevant manufacturing cost.

Second, U.S. patent application of 2006/0109640 to Fong generally discloses a photographic light diffuser comprising a semi-transparent cowl and a removable semi transparent cover detachably mounted on the cowl. The invention disclosed in that patent aims to solve the problem of immobility and inconvenient use of conventional light diffusers or flashlights in outdoor environment. It does not, however, address the problems for conventional flashlights as described above.

Third, U.S. patent application of 2006/0109641 to Fong discloses a photographic light diffusing device comprising a partially transparent cowl, wherein the cowl has a plurality of ribs for achieving studio-quality lighting performance. According to the published patent application, the ribs allow light to be more effectively diffused as it passes through the cowl and into the area in which a photograph is being taken. Now the problem with this invention is that while the diffuser may work fairly well for producing a studio-quality lighting performance, it is certainly not ideal for producing an adequately long-lasting flashing effect. For example, when a photographer wishes to expose the film for a relatively long period of time, such as when the photographer wishes to introduce a particular aesthetic effect for the resulting photographs, the photographer may require a more long-lasting flash instead of conventional flash produced by conventional flashlights. Obviously, one may alter the illumination time of the light source in order to produce flashes with prolonged period of time. While this is theoretically possible, it is not feasible or even desirable in practice. This is because when the illumination time of the light source is lengthened, the overall aesthetic effect of the photograph may be undesirably altered in addition to what is expected from prolonging the illumination time of the light source.

Finally, a general problem about conventional light diffusers: almost all conventional light diffusers fail to achieve a satisfactorily uniform lighting performance. This is partly due to the fact that the geometry of the cowl or the flash housing does not match with the physical nature of light propagation.

SUMMARY OF THE PRESENT INVENTION

A main object of the present invention is to provide a light diffusion arrangement for a photographic device having a flashlight, wherein the light diffusion arrangement is capable of diffracting and diffusing flashes produced by the flashlight for generating an optimal lighting effect for the photographic device.

Another object of the present invention is to provide a light diffusion arrangement for a photographic device having a flashlight, wherein the light diffusion arrangement is adapted to maximize the period in which soft and uniform flashes are produced to illuminate a targeted object.

Another object of the present invention is to provide a light diffusion arrangement for a photographic device having a flashlight, wherein the light diffusion arrangement is arranged to operate according to the physical nature of light propagation for producing uniformly diffused illumination.

Another object of the present invention is to provide a light diffusion arrangement for a photographic device having a flashlight, wherein the light diffusion arrangement does not involve complicated manufacturing procedures so as to minimize the manufacturing cost of the present invention.

Accordingly, in order to accomplish the above objects, the present invention provides a light diffusion arrangement for a photographic device having a flashlight, comprising:

a diffuser housing having a base portion for mounting with the flashlight of the photographic device, and a light-admissible surrounding sidewall radially extended from the base portion to define a light diffraction cavity within the base portion and the surrounding sidewall;

a plurality of diffracting mesh members integrally formed on an inner side surface of the surrounding sidewall of the diffuser housing, wherein each of the diffracting mesh members is adapted to diffract light impinging thereon to a predetermined direction within the light diffraction cavity; and a plurality of light diffusing elements integrally formed on an outer side surface of the surrounding sidewall of the diffuser housing, wherein the diffracted light is arranged to impinge on the light diffusing elements from the light diffraction cavity, in such a manner that each of the light diffusing elements is adapted to diverge the diffracted light for diffusing the diffracted light, so as to provide a uniform light diffusion effect as an optimal lighting effect for the photographic device.

These and other objectives, features, and advantages of the present invention will become apparent from the following detailed description, the accompanying drawings, and the appended claims.

DETAILED DESCRIPTION OF THE PREFERRED EMBODIMENT

Figure 1:
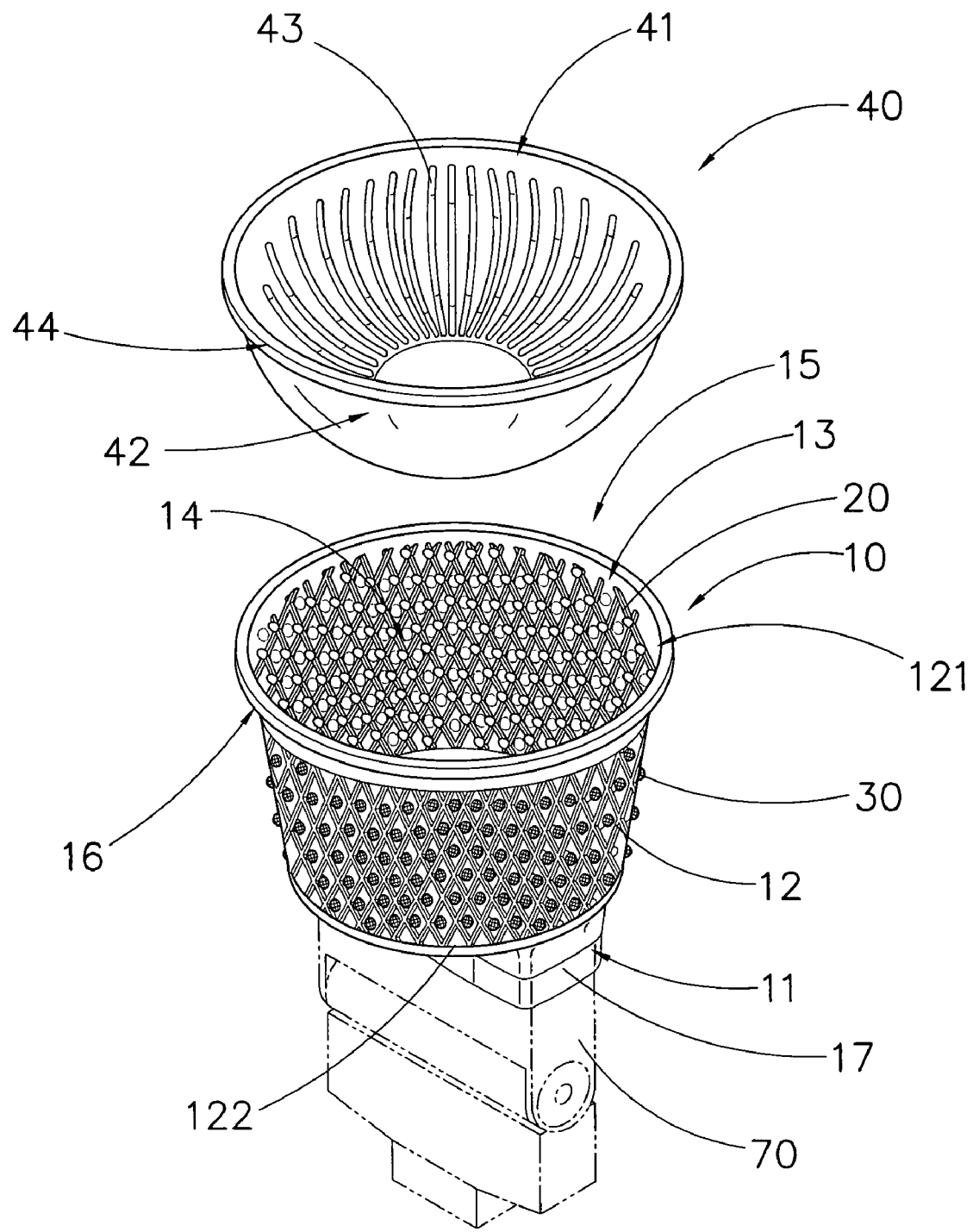
FIG. 1 is a perspective view of a light diffusion arrangement according to a preferred embodiment of the present invention.
Figure 2:
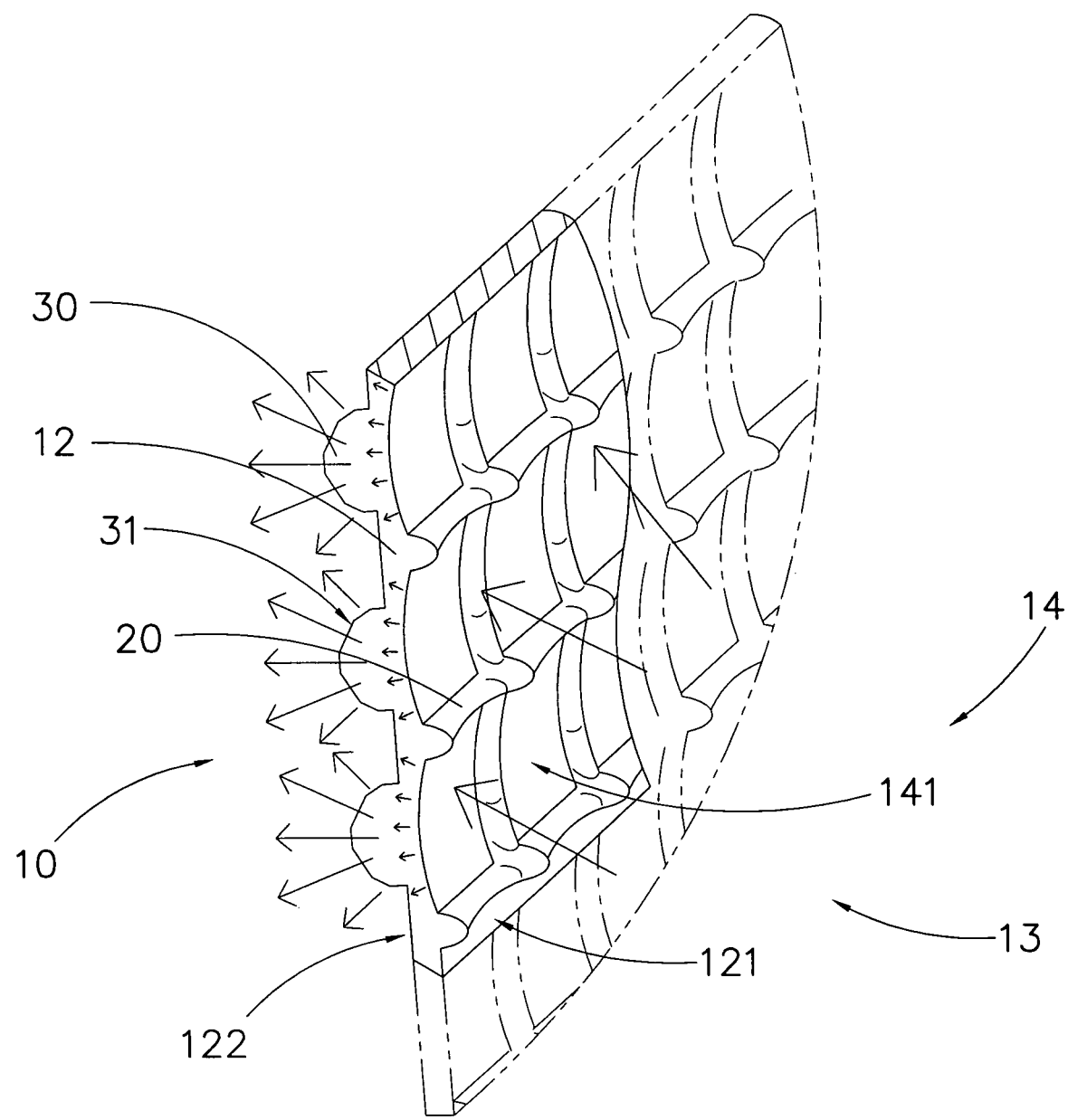
FIG. 2 is a schematic diagram of the light diffusion arrangement according to the above preferred embodiment of the present invention.
Figure 3:
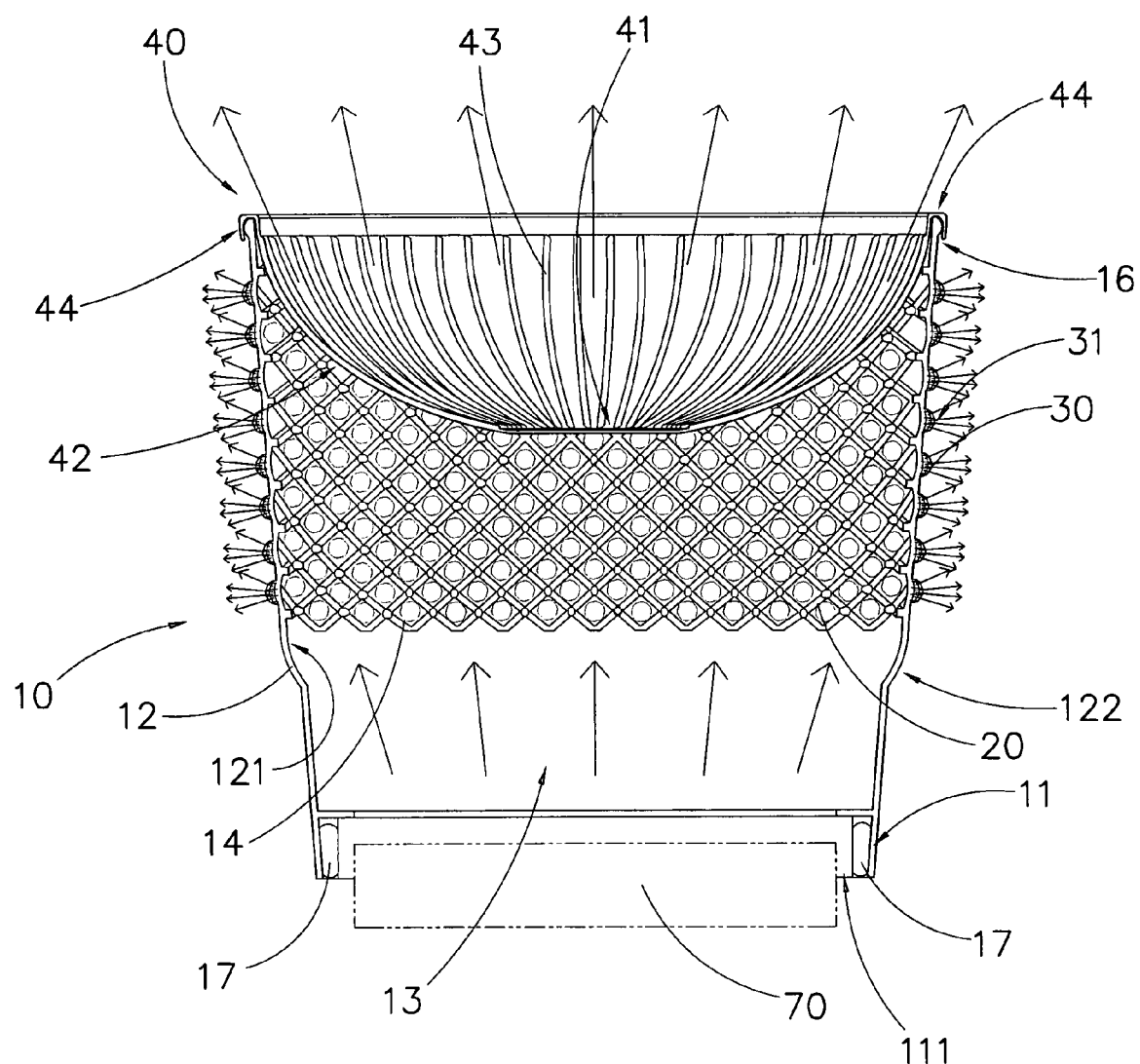
FIG. 3 is a sectional side view of the light diffusion arrangement according to the above preferred embodiment of the present invention.

Referring to FIG. 1 to FIG. 3 of the drawings, a light diffusion arrangement according to a preferred embodiment of the present invention is illustrated. The light diffusion arrangement is for a photographic device having a flashlight 70, and comprises a diffuser housing 10, a plurality of diffracting meshes 20, and a plurality of light diffusing elements 30.

The diffuser housing 10 has a base portion 11 for mounting with the flashlight 70 of the photographic device, and a light-admissible surrounding sidewall 12 extended from the base portion 11 to define a light diffraction cavity 13 within the base portion 111 and the surrounding sidewall 12.

The plurality of diffracting mesh members 20 is formed on an inner side surface 121 of the surrounding sidewall 12 of the diffuser housing 10, wherein each of the diffracting mesh members 20 is adapted to diffract light impinging thereon to a predetermined direction within the light diffraction cavity 13.

The plurality of light diffusing elements 30 is formed on an outer side surface 122 of the surrounding sidewall 12 of the diffuser housing 10, wherein the diffracted light is arranged to impinge on the light diffusing elements 30 from the light diffraction cavity 13 through penetration of the surrounding sidewall 12, in such a manner that each of the light diffusing elements 30 is adapted to diverge the diffracted light for diffusing the diffracted light, so as to provide a uniform light diffusion effect as an optimal lighting effect for the photographic device to illuminate a targeted object. In other words, the diffraction and diffusion of the light provide a double divergence effect of the flash light.

According to the preferred embodiment of the present invention, the diffuser housing 10 is made of transparent material, such as transparent plastic materials or glass, wherein the base portion 11 has a base opening 111 for detachably mounting to the flashlight 70 such that the light generated by the flashlight 70 is allowed to pass though the light diffraction cavity 13 for being diffracted and diffused.

The light-admissible surrounding sidewall 12 is integrally and radially extended from the base portion 11 to form the light diffraction cavity 13, wherein the surrounding sidewall 12 forms a circular cross section of the diffuser housing 10 for matching with the spherical propagation of light coming from the flashlight 70. It is worth mentioning, however, that the diffuser housing 10 may form different cross sections for achieving different light effects as different circumstances of operation require.

On the other hand, the diffracting mesh members 20 are integrally protruded from the inner side surface 121 of the surrounding sidewall 12, wherein each of the diffracting mesh members 20 is extended along the surrounding sidewall 12 in a cross manner to form a corresponding number of diffraction squares 14 surrounded by four corresponding diffracting mesh members 20. When the light coming from the flashlight 70 impinges on the diffracting mesh members 20, the light will be diffracted, and then and partially reflected back to the light diffraction cavity 13. Some portion of light passes through the surrounding sidewall 12 and reaches an exterior of the diffuser housing 10. It is worth to mention that the diffracting mesh members 20 can be extended on the surrounding sidewall 12 to form the diffraction portions each having a square shape as the diffraction square 14 or other configurations such as polygonal shape or triangular shape.

The light diffusion elements 30 are integrally and spacedly formed on the outer surface 122 of the surrounding sidewall 12 for diffusing the diffracted light passing through the inner surface 121 of the surrounding sidewall 12. According to the preferred embodiment of the present invention, each of the light diffusion elements 30 is substantially spherical contour and has a concave portion for diverging light passing therethrough. Thus, when the diffracted light coming from the light diffraction cavity 13 passes through the light diffusion elements 30, it will be further diverged for providing a uniform diffusion of flash light coming out from the diffuser housing 10. Since the light diffusion elements 30 are discretely provided on the outer surface 122 of the surrounding sidewall 12, therefore, the extent to which the diffracted light is diffused depends on the number of the light diffusion elements 30 provided. The more the light diffusion elements 30, the more uniform the diffusion light effect. Obviously, however, one must appreciate that the exact number of light diffusion elements 30 ultimately depends on the circumstances in which the present invention is intended to be utilized.

Referring to FIG. 1 to FIG. 3 of the drawings, each of the light diffusion elements 30 has a plurality of inclined but flat outer surfaces 31 extended along the contour of that light diffusion element 30 so as to form a substantially spherical shape of the contour. It is, however, worth mentioning that each of the light diffusion elements may also be smoothly spherical in shape so as to diffuse the light impinging thereon.

In order to enhance the diffusion performance of the present invention, each of the diffraction squares 14 has a concave indention 141 formed within the diffusion square 14 such that the light impinging on the concave indentation 141 is preliminarily diverged before reaching the light diffusion elements 30. As shown in FIG. 2, the light diffusion elements 30 are integrally protruded from the outer side surface 122 of the surrounding sidewall 12 to align with the concave indentions 141 of the diffraction squares 14 respectively such that when the light projects towards the concave indentions 141 of the diffraction squares 14, the light will be diffracted at the concave indentions 141 of the diffraction squares 14. Then, the diffracted light will penetrate the surrounding sidewall 12 of the diffuser housing 10 and will be diffused by the light diffusion elements 30.

Alternatively, a plurality of curved indenting surfaces are spacedly formed on the inner side surface 121 of the surrounding sidewall 12 in order to spacedly form the concave indentions 141 on the inner side surface 121 of the surrounding sidewall 12

The light diffusion arrangement further comprises a front cover 40 provided on a front opening 15 of the diffuser housing 10, wherein the front cover 40, having an inverted dome shape, a front concave surface 41 and a corresponding rear convex surface 42, is detachably attached on surrounding rim edge portion 16 of the diffuser housing 10. The front cover 10 is semi-transparent in color for softening the intensity of the light coming therefrom. The front cover 40 further has a plurality of light diffusion ribs 43 radially formed on the rear convex surface 42 for enhancing diffusion of light coming from the light diffraction cavity 13 of the diffuser housing 10.

Moreover, in order to facilitate convenient use of the present invention, the front cover 40 further has a U-shaped clipping rim 44 formed as a peripheral side edge portion of the front cover 40, wherein the clipping rim 44 is adapted to detachably clip on the surrounding rim edge portion 16 of the diffuser housing 10 so as to detachably attach the front cover 40 with the diffuser housing 10 without additional equipments. The front cover 40 may be formed to have a wide variety of ribs 43 or aesthetic patterns so as to alter the overall lighting effect provided by the present invention. In other words, the present invention can be optimally utilized in a wide variety of circumstances.

Finally, the diffuser housing 10 further comprises a plurality of retention members 17 integrally and inwardly extended from a sidewall of the base portion 11 to engage with the flashlight 70 so as to normally retain the flashlight in position when it is coupled with the light diffusion arrangement of the present invention.

The operation of the present invention is as follows: the flashlight 70 is first mounted at the base opening 111 of the diffuser housing 10, which is then adjusted to face a targeted object to be captured by the photographic device. When the flashlight 70 flashes to generate the light, the light will project towards the surrounding sidewall 12 and will be diffracted within the light diffraction cavity 13 by the diffracting mesh members 20. The diffracted light will pass through the surrounding sidewall 12 of the diffuser housing 10 and will further be diffused by the light diffusing elements 30. The front cover 40 will also help diffusing the light so as to produce a uniform diffusion effect of the present invention. It is important to point out that the light thus diffracted and diffused enjoys a longer illuminating period and more uniform light effect as compared to the light produced by the conventional flashlight diffusers.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A light diffusion arrangement for a photographic device having a flashlight, comprising:

a diffuser housing having a base portion for mounting with said flashlight of said photographic device, and a light-admissible surrounding sidewall extended from said base portion to define a light diffraction cavity within said base portion and said surrounding sidewall;

a plurality of diffracting mesh members formed on an inner side surface of said surrounding sidewall of said diffuser housing, wherein each of said diffracting mesh members is adapted to diffract light impinging thereon to a predetermined direction within said light diffraction cavity for forming corresponding diffracted light; and a plurality of light diffusing elements formed on an outer side surface of said surrounding sidewall of said diffuser housing, wherein said diffracted light is arranged to impinge on said light diffusing elements from said light diffraction cavity, in such a manner that each of said light diffusing elements is adapted to diverge said diffracted light for diffusing said diffracted light, so as to provide a uniform light diffusion effect as an optimal lighting effect for said photographic device, wherein said base portion of said diffuser housing has a base opening for mounting said flashlight such that light generated by said flashlight is allowed to pass though said light diffraction cavity for being diffracted and diffused by said diffracting mesh members and said light diffusing elements respectively, wherein said light-admissible surrounding sidewall is integrally and radially extended from the base portion to form the light diffraction cavity, wherein said surrounding sidewall forms a circular cross section of said diffuser housing for matching with a spherical propagation of said light coming from said flashlight, wherein said diffracting mesh members are integrally protruded from said inner side surface of said surrounding sidewall, wherein each of said diffracting mesh members is extended along said surrounding sidewall in a cross manner to form a corresponding number of diffraction squares surrounded by four corresponding diffracting mesh members, such that when said light coming from said flashlight impinges on said diffracting mesh members, said light is diffracted, and then partially reflected back to said light diffraction cavity for further diffraction, while a remaining portion of light passes through said surrounding sidewall and reaches said light diffusing elements.

2. The light diffusion arrangement, as recited in claim 1, wherein said light diffusion elements are integrally and spacedly formed on said outer surface of said surrounding sidewall for diffusing said diffracted light passing through said inner surface of said surrounding sidewall, wherein each of said light diffusion elements has a substantially spherical contour and has a concave portion for diverging light passing therethrough, in such a manner that when said diffracted light passes through said light diffusion elements, said diffracted light is further diverged for providing a uniform diffusion of flash light coming out from said diffuser housing.

3. The light diffusion arrangement, as recited in claim 2, wherein each of said diffraction squares has a concave indention formed within said diffusion square such that said light impinging on said concave indentation is preliminarily diverged before reaching said light diffusion elements so as to enhance an extent to which said light is diffused.

4. The light diffusion arrangement, as recited in claim 3, wherein further comprising a front cover provided on a front opening of said diffuser housing, wherein said front cover, having an inverted dome shape, a front concave surface and a corresponding rear convex surface, is detachably attached on a surrounding rim edge portion of said diffuser housing for assisting diffusion of said light in said light diffraction cavity, wherein said front cover is semi-transparent in color for softening said intensity of said light coming therefrom.

5. The light diffusion arrangement, as recited in claim 4, wherein said front cover further has a plurality of light diffusion ribs radially and spacedly formed on said rear convex surface for enhancing said diffusion of light coming from said light diffraction cavity.

6. The light diffusion arrangement, as recited in claim 5, wherein said front cover further has a U-shaped clipping rim formed as a peripheral side edge portion of said front cover, wherein said clipping rim is adapted to detachably clip on said surrounding rim edge portion of said diffuser housing so as to detachably attach said front cover with said diffuser housing without additional equipment.

7. The light diffusion arrangement, as recited in claim 1, wherein each of said diffraction squares has a concave indention formed within said diffusion square such that said light impinging on said concave indentation is preliminarily diverged before reaching said light diffusion elements so as to enhance an extent to which said light is diffused.

8. The light diffusion arrangement, as recited in claim 7, wherein further comprising a front cover provided on a front opening of said diffuser housing, wherein said front cover, having an inverted dome shape, a front concave surface and a corresponding rear convex surface, is detachably attached on a surrounding rim edge portion of said diffuser housing for assisting diffusion of said light in said light diffraction cavity, wherein said front cover is semi-transparent in color for softening said intensity of said light coming therefrom.

9. The light diffusion arrangement, as recited in claim 8, wherein said front cover further has a plurality of light diffusion ribs radially and spacedly formed on said rear convex surface for enhancing said diffusion of light coming from said light diffraction cavity.

10. A light diffusion arrangement for a photographic device having a flashlight, comprising:
a diffuser housing having a base portion for mounting with said flashlight of said photographic device, and a light-admissible surrounding sidewall extended from said base portion to define a light diffraction cavity within said base portion and said surrounding sidewall;
a plurality of diffracting mesh members formed on an inner side surface of said surrounding sidewall of said diffuser housing, wherein each of said diffracting mesh members is adapted to diffract light impinging thereon to a predetermined direction within said light diffraction cavity for forming corresponding diffracted light; and
a plurality of light diffusing elements formed on an outer side surface of said surrounding sidewall of said diffuser housing, wherein said diffracted light is arranged to impinge on said light diffusing elements from said light diffraction cavity, in such a manner that each of said light diffusing elements is adapted to diverge said diffracted light for diffusing said diffracted light, so as to provide a uniform light diffusion effect as an optimal lighting effect for said photographic device, wherein said diffracting mesh members are integrally protruded from said inner side surface of said surrounding sidewall, wherein each of said diffracting mesh members is extended along said surrounding sidewall in a cross manner to form a corresponding number of diffraction squares surrounded by four corresponding diffracting mesh members, such that when said light coming from said flashlight impinges on said diffracting mesh members, said light is diffracted, and then partially reflected back to said light diffraction cavity for further diffraction, while a remaining portion of light passes through said surrounding sidewall and reaches said light diffusing elements, wherein said light diffusion elements are integrally and spacedly formed on said outer surface of said surrounding sidewall for diffusing said diffracted light passing through said inner surface of said surrounding sidewall, wherein each of said light diffusion elements has a substantially spherical contour and has a concave portion for diverging light passing therethrough, in such a manner that when said diffracted light passes through said light diffusion elements, said diffracted light is further diverged for providing a uniform diffusion of flash light coming out from said diffuser housing.

11. The light diffusion arrangement, as recited in claim 10, wherein each of said diffraction squares has a concave indention formed within said diffusion square such that said light impinging on said concave indentation is preliminarily diverged before reaching said light diffusion elements so as to enhance an extent to which said light is diffused.

12. The light diffusion arrangement, as recited in claim 11, wherein further comprising a front cover provided on a front opening of said diffuser housing, wherein said front cover, having an inverted dome shape, a front concave surface and a corresponding rear convex surface, is detachably attached on a surrounding rim edge portion of said diffuser housing for assisting diffusion of said light in said light diffraction cavity, wherein said front cover is semi-transparent in color for softening said intensity of said light coming therefrom.

13. The light diffusion arrangement, as recited in claim 12, wherein said front cover further has a plurality of light diffusion ribs radially and spacedly formed on said rear convex surface for enhancing said diffusion of light coming from said light diffraction cavity.

14. The light diffusion arrangement, as recited in claim 13, wherein said front cover further has a U-shaped clipping rim formed as a peripheral side edge portion of said front cover, wherein said clipping rim is adapted to detachably clip on said surrounding rim edge portion of said diffuser housing so as to detachably attach said front cover with said diffuser housing without additional equipment.

15. A light diffusion arrangement for a photographic device having a flashlight, comprising:
a diffuser housing having a base portion for mounting with said flashlight of said photographic device, and a light-admissible surrounding sidewall extended from said base portion to define a light diffraction cavity within said base portion and said surrounding sidewall;
a plurality of diffracting mesh members formed on an inner side surface of said surrounding sidewall of said diffuser housing, wherein each of said diffracting mesh members is adapted to diffract light impinging thereon to a predetermined direction within said light diffraction cavity for forming corresponding diffracted light; and
a plurality of light diffusing elements formed on an outer side surface of said surrounding sidewall of said diffuser housing, wherein said diffracted light is arranged to impinge on said light diffusing elements from said light diffraction cavity, in such a manner that each of said light diffusing elements is adapted to diverge said diffracted light for diffusing said diffracted light, so as to provide a uniform light diffusion effect as an optimal lighting effect for said photographic device, wherein said diffracting mesh members are integrally protruded from said inner side surface of said surrounding sidewall, wherein each of said diffracting mesh members is extended along said surrounding sidewall in a cross manner to form a corresponding number of diffraction squares surrounded by four corresponding diffracting mesh members, such that when said light coming from said flashlight impinges on said diffracting mesh members, said light is diffracted, and then partially reflected back to said light diffraction cavity for further diffraction, while a remaining portion of light passes through said surrounding sidewall and reaches said light diffusing element, wherein each of said diffraction squares has a concave indention formed within said diffusion square such that said light impinging on said concave indentation is preliminarily diverged before reaching said light diffusion elements so as to enhance an extent to which said light is diffused.

16. The light diffusion arrangement, as recited in claim 15, wherein further comprising a front cover provided on a front opening of said diffuser housing, wherein said front cover, having an inverted dome shape, a front concave surface and a corresponding rear convex surface, is detachably attached on a surrounding rim edge portion of said diffuser housing for assisting diffusion of said light in said light diffraction cavity, wherein said front cover is semi-transparent in color for softening said intensity of said light coming therefrom.

* * * * *